(12) United States Patent
Teeter

(10) Patent No.: US 11,751,520 B2
(45) Date of Patent: Sep. 12, 2023

(54) METHOD OF ADJUSTING A MOBILE DRIP TUBE IRRIGATION SYSTEM HAVING ADJUSTABLE DRIP TUBE POSITIONING

(71) Applicant: Monty J. Teeter, Ulysses, KS (US)

(72) Inventor: Monty J. Teeter, Ulysses, KS (US)

( * ) Notice: Subject to any disclaimer, the term of this patent is extended or adjusted under 35 U.S.C. 154(b) by 0 days.

(21) Appl. No.: 18/062,840

(22) Filed: Dec. 7, 2022

(65) Prior Publication Data

US 2023/0114275 A1    Apr. 13, 2023

Related U.S. Application Data

(62) Division of application No. 16/028,484, filed on Jul. 6, 2018, now Pat. No. 11,547,066.

(60) Provisional application No. 62/529,030, filed on Jul. 6, 2017.

(51) Int. Cl.
*A01G 25/02* (2006.01)
*A01G 25/09* (2006.01)

(52) U.S. Cl.
CPC .......... *A01G 25/02* (2013.01); *A01G 25/092* (2013.01)

(58) Field of Classification Search
CPC .... A01G 25/02; A01G 25/023; A01G 25/026; A01G 25/09; A01G 25/092; A01G 25/095; F16L 13/18; B66D 1/60
See application file for complete search history.

(56) References Cited

U.S. PATENT DOCUMENTS

| 2,889,948 | A | * | 6/1959 | Leuenberger | .......... A01G 25/09 414/800 |
|---|---|---|---|---|---|
| 3,223,461 | A | | 12/1965 | Stout | |
| 3,726,478 | A | | 4/1973 | McMurray | |
| 4,491,274 | A | | 1/1985 | Noble | |
| 4,763,836 | A | | 8/1988 | Lyle et al. | |
| 5,421,514 | A | | 6/1995 | McKenry | |
| 5,779,163 | A | * | 7/1998 | Gunter | ................. A01G 25/092 239/734 |
| 5,937,489 | A | | 8/1999 | Gunter | |
| 6,068,197 | A | | 5/2000 | Tolson | |
| 6,343,749 | B1 | | 2/2002 | Thom | |
| 6,431,475 | B1 | | 8/2002 | Williams | |
| 6,666,384 | B2 | | 12/2003 | Prandi | |

(Continued)

FOREIGN PATENT DOCUMENTS

| CN | 2308250 | 2/1999 |
|---|---|---|
| CN | 202232408 U | 5/2012 |
| WO | 2007071264 A1 | 6/2007 |

*Primary Examiner* — Christopher R Dandridge
(74) *Attorney, Agent, or Firm* — AVEK IP, LLC; Kent R. Erickson

(57) ABSTRACT

A mobile drip irrigation system includes a plurality of drip tubes anchored at a first end to a water supply conduit. As the mobile irrigation system travels across a surface to be watered a second, free end of each drip tube is pulled along the surface to provide precise and uniform water distribution through the drip tubes. A cable extending across each section of the mobile irrigation system is attached to the plurality of drip tubes within that section, with the cable movable via a winch mechanism to shift the position of the drip tubes within that section to correspondingly shift the drag path of the tubes to a desired location. In exemplary embodiments, a lower manifold distributes water to the drip tubes, and in further embodiments a support restraint provides support to the lower manifold.

20 Claims, 8 Drawing Sheets

(56) References Cited

U.S. PATENT DOCUMENTS

| | | |
|---|---|---|
| 8,210,445 B2 | 7/2012 | Coleman et al. |
| 8,807,465 B2 | 8/2014 | Korus et al. |
| 9,885,182 B1 | 2/2018 | Harkins |
| 2007/0176030 A1 | 8/2007 | Korus |
| 2007/0221763 A1* | 9/2007 | Sieling ................ A01G 25/092 239/728 |
| 2012/0227835 A1 | 9/2012 | Korus et al. |
| 2016/0021835 A1* | 1/2016 | Teeter ................ A01G 25/092 239/737 |

* cited by examiner

METHOD OF ADJUSTING A MOBILE DRIP TUBE IRRIGATION SYSTEM HAVING ADJUSTABLE DRIP TUBE POSITIONING

CROSS-REFERENCE TO RELATED APPLICATIONS

This application is a divisional of U.S. patent application Ser. No. 16/028,484, filed Jul. 6, 2018, which claims the benefit of U.S. Provisional Patent Application No. 62/529,030, filed Jul. 6, 2017, the disclosures of which are hereby incorporated herein in their entirety by reference.

BACKGROUND

The present invention relates to irrigation systems, and more particularly to mobile irrigation systems for providing water to agricultural fields. Specifically, the invention relates to a mobile drip tube irrigation system having adjustable drip tube positioning.

Mobile irrigations systems, such as center-pivot irrigation systems or lateral irrigation systems, typically include a water distribution conduit supported across a series of spaced-apart motorized towers that transport the conduit over an agricultural field. Water from the distribution conduit is delivered to sprinkler nozzles or drip tubes which convey the water to the soil in the field.

In center pivot irrigation systems, the water distribution conduit extends radially outwardly from a fixed center tower—typically positioned in the center of the field or area to be watered—where the conduit is attached to a water supply. A series of motorized drive towers transport the water distribution conduit in a circular or arcuate path over the field as the water is applied to the field through the sprinkler nozzles or drip tubes. The sprinkler nozzles or drip lines are in fluid communication with the water distribution conduit and apply water to the field through a spraying or sprinkling action—in the case of sprinkler nozzle systems—or through drip tubes dragged along the surface of the field—in the case of drip tube systems Lateral mobile irrigation systems operate in a similar manner, but advance in a linear path across the field, with the water distribution conduit similarly transported by a series of motorized drive towers.

Drip tube irrigation systems are generally more efficient than sprinkler nozzle irrigation systems in that the drip tubes emit water directly onto the soil so that the water is absorbed quickly with little evaporation. By contrast, water sprayed by sprinkler nozzle systems is susceptible to evaporation before reaching the soil. Drip tube irrigation systems are also generally more precise because placement of the water is directly related to the drag path of the drip tube, while placement of water in sprinkler nozzle systems can be affected by wind and can be impeded or blocked by foliage.

Known mobile drip tube irrigation systems, while more efficient and precise than sprinkler nozzle irrigation systems, are not without drawbacks. For example, typical mobile drip tube irrigation systems attach the drip tubes, or the manifolds and/or feed lines from which the drip tubes extend, to a fixed cable or support so that the drip tubes maintain their relative spacing to each other and to the motorized towers transporting the drip tubes across the field. The attachment of the drip tubes to fixed supports does not allow the drip tubes to accommodate specific situations encountered in the field, such as avoiding direct drip tube contact with fragile seedlings, or accounting for season-to-season changes in crop positioning.

Thus it can be seen that there remains a need in the art for an improved mobile drip tube irrigation system.

SUMMARY

Embodiments of the invention are defined by the claims below, not this summary. A high-level overview of various aspects of the invention is provided here to introduce a selection of concepts that are further described in the Detailed Description section below. This summary is not intended to identify key features or essential features of the claimed subject matter, nor is it intended to be used in isolation to determine the scope of the claimed subject matter. In brief, this disclosure describes a mobile drip tube irrigation system with adjustable drip tube positioning.

The present invention is directed to a mobile drip tube irrigation system having adjustable drip tube positioning. Two anchoring cables stretched horizontally across a section of the irrigation system are attached to a plurality of drop lines extending downwardly from a water distribution conduit running across the top of the irrigation system, the drop lines extending generally perpendicular to the horizontal cables.

The drop tubes attach to drip tubes which extend onto the agricultural field being watered, with water supplied from the water distribution conduit, through the drop lines and to the drip tubes, where water is distributed to the field as the drip tubes are dragged along the surface of the field.

The anchoring cables are attached at each end to a winch mechanism which is itself attached to the corresponding motorized tower at opposite ends of the section. The winch mechanism at each end of each anchoring cable allow a user to adjust or shift the anchoring cables by releasing slack cable at the winch mechanism at one end of the cable and taking up the slack with the winch mechanism at the opposite end of the cable so that the position of the cable is shifted laterally with respect to the motorized towers.

Because the drop lines are attached to the anchoring cables, shifting the position of the cables likewise shifts the positioning of the drop lines with respect to the towers, so that shifting the cables simultaneously shifts the position of all of the drop lines within that section of the irrigation system, and correspondingly shifts the position of the drip tubes attached to those drop lines. With the position of the drip tubes shifted, the drag path of those drip tubes is likewise shifted.

Thus, using the winch mechanism at each end of the anchoring cables, the positioning of the drip tubes can be adjusted as desired by a user. For example, the drip tubes can be shifted or adjusted so that the drag path of the drip tubes is directly over newly planted seeds so that water is emitted from the drip tubes directly over the seeds for germination, or the drip tubes may be shifted to one side of a respective row of emerging seedlings and preferably between adjacent rows so that water is emitted between the rows of emerging seedlings and so that the drip tubes do not contact the fragile seedling. Or, the drip tubes can be adjusted seasonally to account for crop rotation or planting of crops in the rows between the last seasons plantings. Shifting or adjusting the drip tubes thus allows more efficient delivery of a precisely controlled amount of water to the soil at a precisely determined position.

Corresponding anchoring cables and winch mechanism are included in each section of the irrigation system so that the drip tubes in that section can be adjusted as required.

In one exemplary embodiment, the drop lines are attached to two anchoring cables extending across the section of irrigation system, with each end of each anchoring cable attached to a winch mechanism at the corresponding motorized tower.

In alternative embodiments, one end of each anchoring cable is attached to a winch mechanism, with the other end of the anchoring cable affixed to the tower via an adjustable attachment, such as a chain and hook attachment so that slack can be introduced to, or taken up from, the anchoring cable by hooking onto a different link of the chain, with the winch mechanism at the opposite end of the anchoring cable used to pull the anchoring cable taut in the shifted position.

In further embodiments, drip tubes may extend directly from the water distribution conduit without the use of drop lines, with the drip tubes attached to the anchoring cables. In other embodiments, the irrigation system includes a single adjustable anchoring cable, with the drop lines or drip tubes attached to that single cable.

In additional embodiments, one or more manifolds extend horizontally across the section, with each manifold receiving water from the water distribution conduit and with a plurality of drip tubes extending downwardly from each manifold. Each manifold is attached to the anchoring cable so that shifting or adjusting the anchoring cable similarly shifts or adjusts the position of each manifold, which in turn shifts the position of the drip tubes attached to that manifold.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about", "approximately", "generally" and other terms of approximation as used herein denote deviations from the exact value in the form of changes or deviations that are insignificant to the function.

Embodiments of the invention include various configurations of a mobile drip tube irrigation system having adjustable drip tube positioning. Various embodiments employ various techniques for shifting or adjusting the position of drip tubes pulled along the surface of an agricultural field being watered so that the drag path of the drip tubes is controlled to a desired path.

Figure 1:
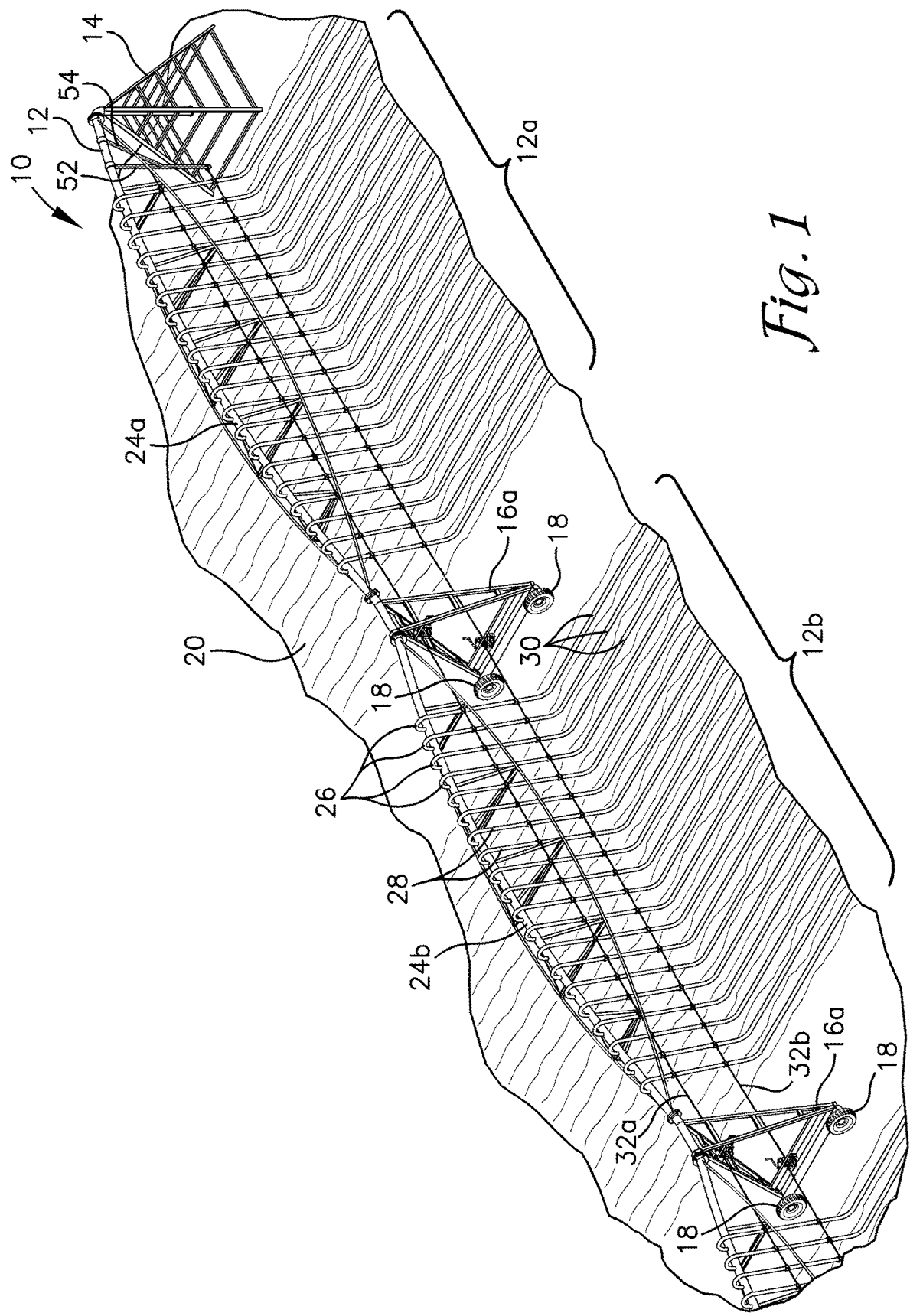
FIG. 1 is a perspective view of a portion of a multi-section mobile center-pivot drip line irrigation system with adjustable drip tube positioning in accordance with an exemplary embodiment of the present invention.

Looking first to FIG. 1, a center pivot, mobile drip tube irrigation system having adjustable drip tube positioning in accordance with a first exemplary embodiment of the present invention is designated by the numeral 10. The center-pivot irrigation system 10 comprises a water distribution conduit 12 originating at a fixed center pivot tower 14 and extending across multiple sections—e.g., 12a, 12b—of the irrigation system. A "section" of the irrigation system referring to the two towers defining the section and the hardware and plumbing therebetween. For example, section 12a is defined by center pivot tower 14 and the first motorized tower 16a, section 12b is defined by the first motorized tower 16a and the second motorized tower 16b. Additional full sections of the irrigation system (not shown) would similarly extend successively radially outwardly with an additional motorized tower for each additional section.

Each motorized tower 16a, 16b includes two wheels 18 which engage the soil surface of the agricultural field 20 and which are driven by an electric or hydrostatic motor (not shown) to move the irrigation system over the agricultural field.

Water is distributed across the irrigation system 10 via water distribution conduit 12, which is formed from a plurality of connected segments 24, with each segment extending between and supported by motorized towers at each end, or in the case of the first segment, between and supported by the center pivot tower 14 and the first motorized tower 16a. The water distribution conduit 12 is thus transported over the agricultural field as the motorized towers traverse the field in a circular or arcuate path about the center pivot tower 14. The motorized towers employ conventional guidance and alignment systems to control the drive motors of each tower to maintain the segments 24 of the water distribution conduit 12 in substantial alignment as the mobile irrigation system moves across the field.

The center pivot tower 14 and each motorized tower 16 include a truss structure comprised of triangular shaped upright frame sections connected by horizontal support braces, with a lower horizontal support frame on each motorized tower supporting the wheels 18 of the tower. The ends of adjoining segments 24 comprising the water distribution conduit 12 are attached to and supported by the truss structure near the top of each corresponding tower.

The inner end of the water distribution conduit 12 is connected at the center pivot tower 14 to a water supply conduit which supplies water flow into the water distribution conduit 12 so that the water supply is distributed thorough each connected segment 24 along the entire length of the mobile irrigation system 10.

A series of spaced apart outlet ports are formed in the upper-facing portion of the wall of each segment 24 comprising the water distribution conduit 12. The outlet ports allow water to flow from the water distribution conduit. A U-shaped elbow 26 connected to each outlet port directs the water from the outlet port to a substantially rigid drop line 28 extending downwardly and generally perpendicular to the field 20. A drip tube 30 is attached to the lower end of each drop line 28 so that water flows from the water distribution conduit 22, through the U-shaped elbow 26 and drop line 28, and to the drip tube 30 where the water is precisely distributed onto the field 20 by the drip tube 30.

Figure 2:
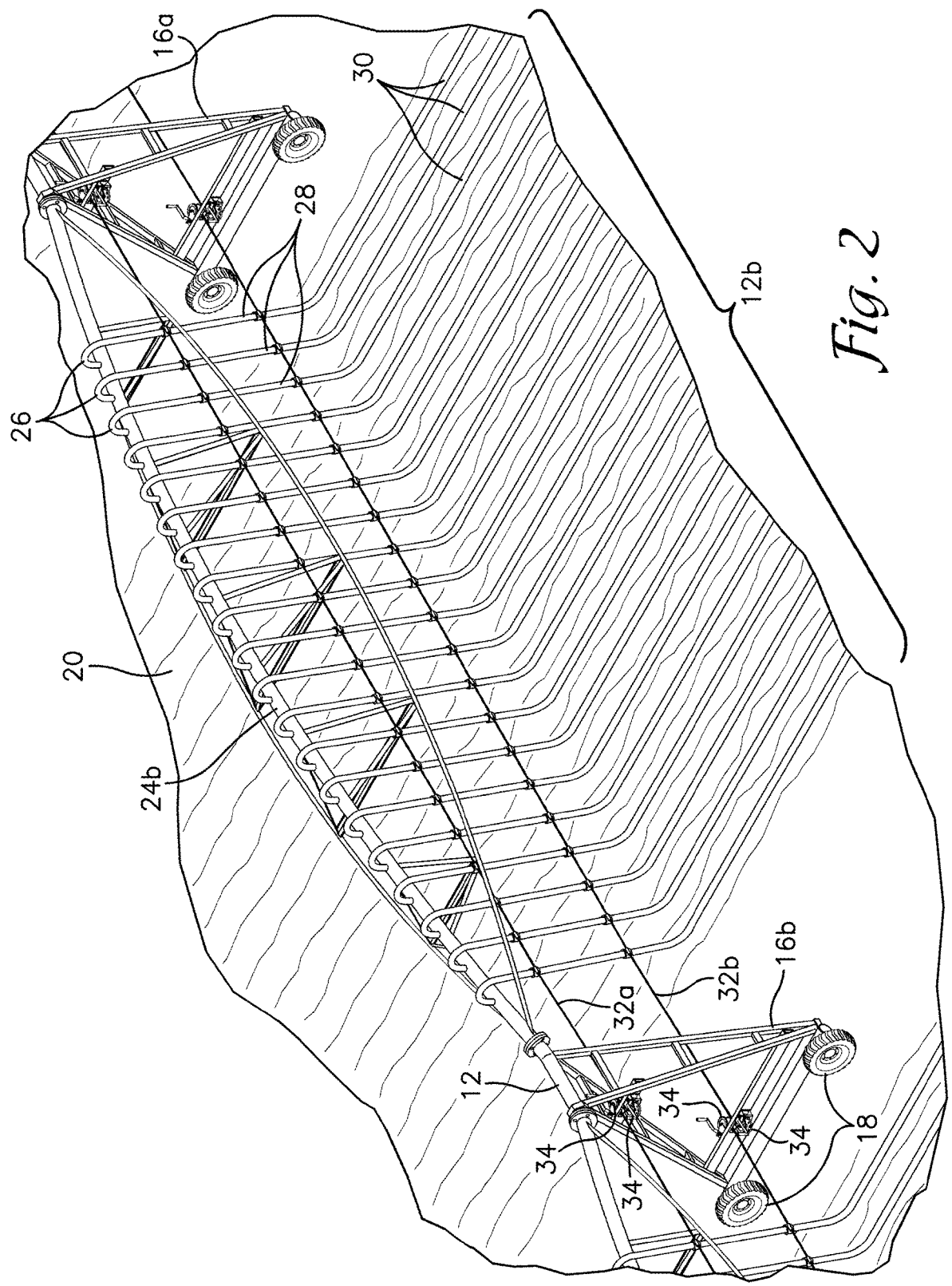
FIG. 2 is a close-up view of a single section of the multi-section mobile center-pivot irrigation system with adjustable drip tube positioning of FIG. 1.

As seen in FIGS. 1 and 2, with a plurality of drip tubes 30 attached to a corresponding plurality of drop lines 28 and U-shaped elbows 26 extending from the corresponding plurality of outlet ports in the corresponding segment 24a, 24b of the water distribution conduit 12, the drip tubes 30 are dragged along behind the water distribution conduit 12 as the irrigation system 10 is moved across the agricultural field 20. Preferably the spacing between adjacent pairs of outlet ports on the segment 24 of the water distribution conduit 12 is the same, so that the corresponding spacing between adjacent drip tubes 30 is also the same. Thus, as shown in the figures, the extended drip tubes 30 are arranged in evenly spaced, essentially parallel relationship as they are dragged across the field 20, with the drag paths of the drip tubes 30 forming concentric arcs as the irrigation system 10 structure pivots about the center pivot tower 14.

Figure 3:
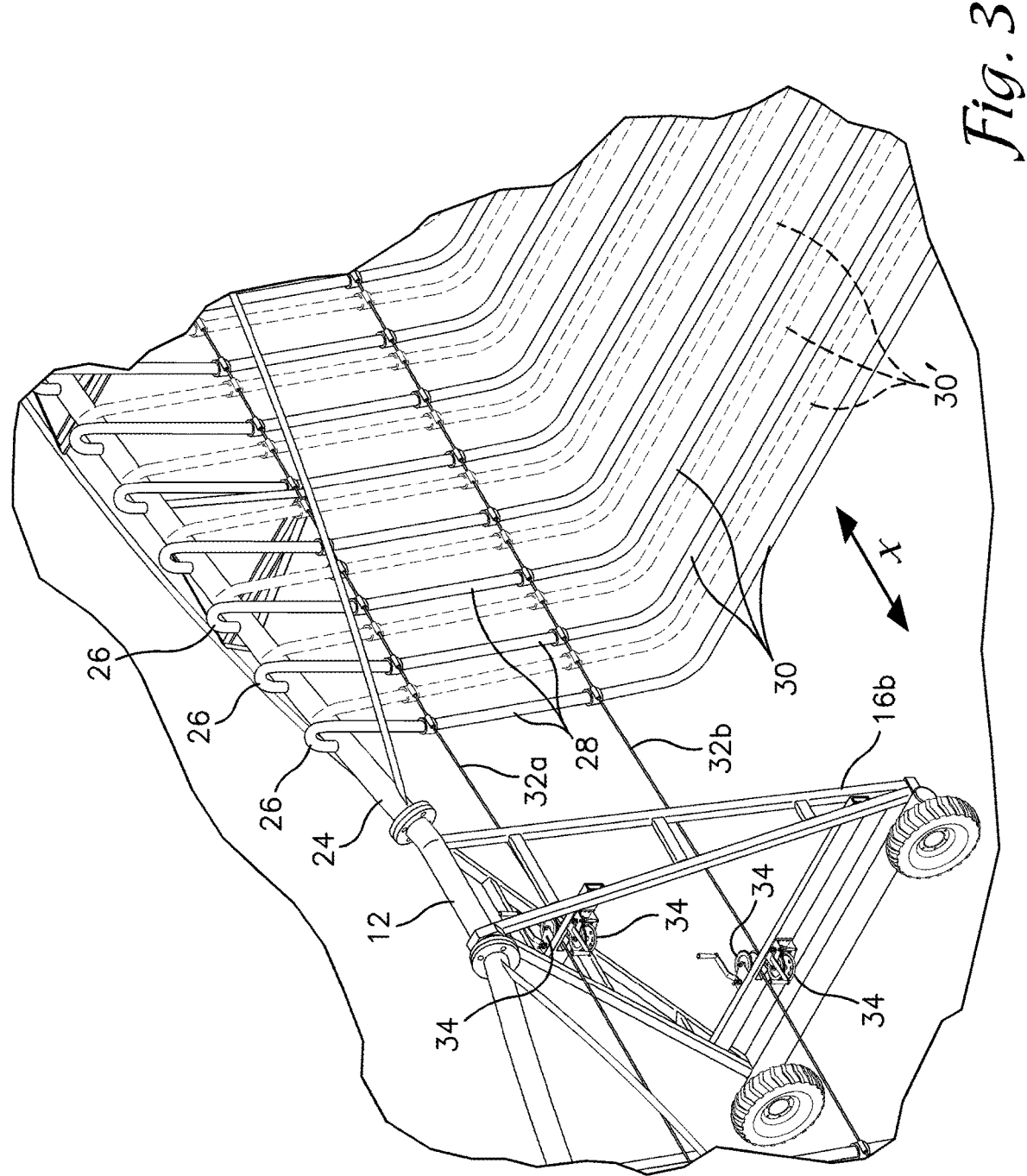
FIG. 3 is a close-up view of a portion of the single section of the multi-section mobile center-pivot irrigation system with adjustable drip tube positioning of FIG. 2 illustrating repositioning of the drip tubes.

Looking to FIGS. 1 through 3, two anchoring cables extend generally horizontally across each section of the mobile irrigation system in spaced apart relationship, with two separate cables associated with, and extending between, the two towers defining that section. Thus, as shown in the figures, anchoring cables 32a and 32b are the two anchoring cables associated with section 12b.

Upper anchoring cable 32a extends between an upper portion of motorized towers 16a and 16b, while lower anchoring cable 32b extends between the lower portion of those two towers. As best seen in FIGS. 2 and 3, each end of each of the two anchoring cables 32a, 32b is attached to a separate winch mechanism 34, with each winch mechanism 34 attached to the structure of the tower in alignment with the corresponding cable. The spacing between the upper and lower anchoring cables 32a and 32b shown in FIGS. 1 through 3 is one example of possible spacing between the cables 32a and 32b. Other spacings may be utilized and a preferred spacing may be between eighteen and seventy two inches depending on the application and the design of the towers 16a.

As seen in FIGS. 1 through 3, the upper anchoring cable 32a in section 12b extends between a winch mechanism 34 attached to the upper portion of the first motorized tower 16a and a winch mechanism 34 attached to the upper portion of the second motorized tower 16b. Similarly, the lower anchoring cable 32b in section 12b extends between a winch mechanism 34 attached to the lower portion of the first motorized tower 16a and a winch mechanism 34 attached to the lower portion of the second motorized tower 16b.

It should be apparent that similar upper and lower anchoring cables are attached to each successive section of the multi-section mobile irrigation system, and that each anchoring cable within each section is attached at each end to a winch mechanism, or other suitable mechanism for adjusting or shifting the longitudinal position of the anchoring cables 32a and 32b relative to the motorized towers 16, as just described.

Each anchoring cable is preferably longer than the section it extends across, with the excess cable wound onto each of the corresponding winch mechanisms. With the cable and the winch mechanism locked so that the anchoring cable is pulled taut between the two towers, essentially horizontal with minimal sag or dip.

Figure 4:
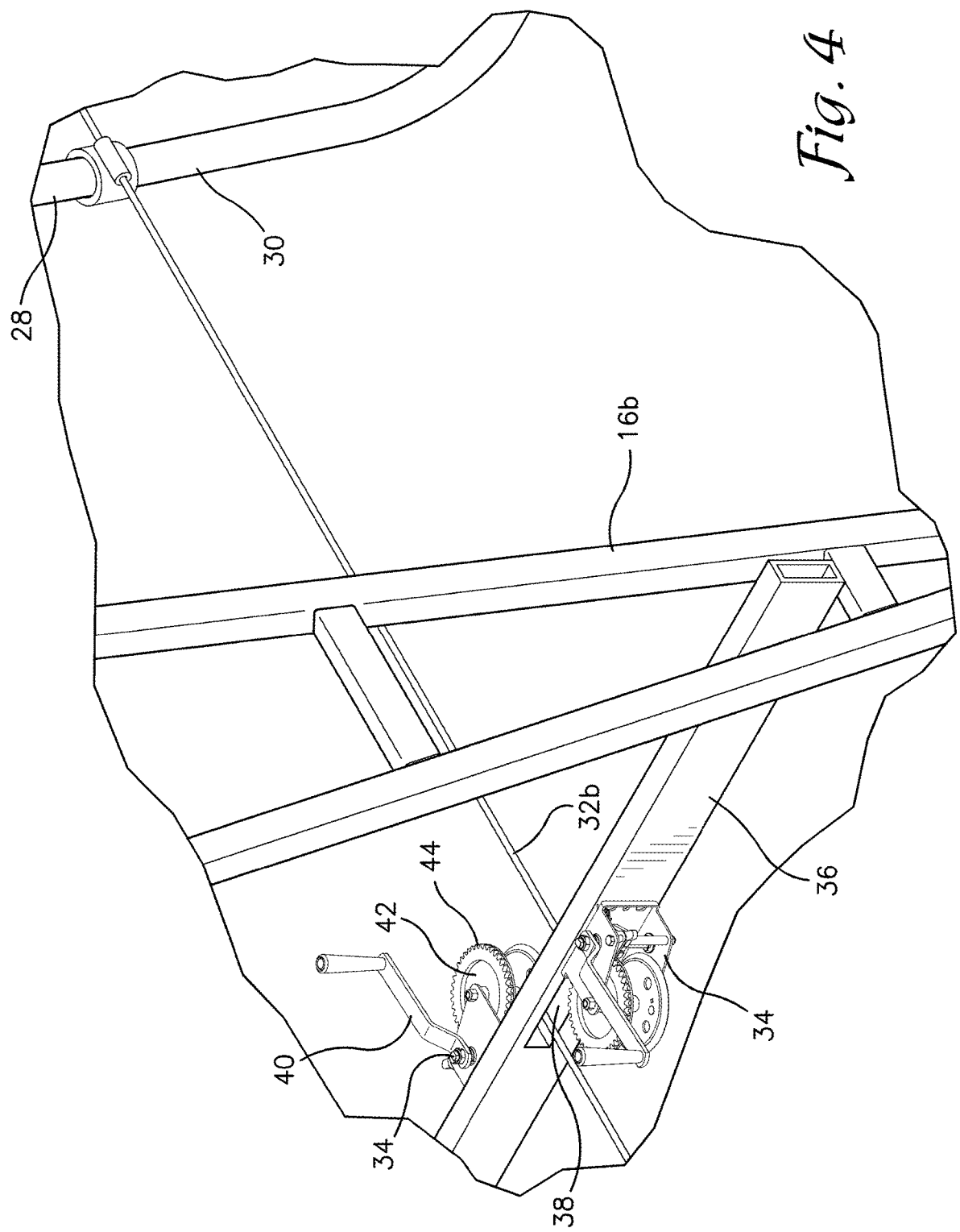
FIG. 4 is a close-up view of the winch drive mechanism of the multi-section mobile center-pivot irrigation system with adjustable drip tube positioning of FIG. 1.

Looking to FIG. 4, each of the winch mechanisms 34 are preferably conventional mechanisms as known in the art which are operated by a rotating handle 40 operable to actuate a drum 42 about which the cable is wound. The drum includes a cam or ratchet mechanism 44 to allow only one-way movement of the drum to wind and tighten the cable. The drum is locked against back rotation until a release is activated, allowing the drum to rotate and the previously wound cable to unwind.

As shown in FIG. 4, each winch mechanism is preferably attached to a horizontal support brace 36 which is a part of the structure of the corresponding tower to which it is attached. A slot 38 formed in the horizontal support brace 36 allows the anchoring cable 32b to pass through so that the cable passes through the slot 38 to the associated winch mechanism 34. Thus, as seen in FIG. 4, the winch mechanisms 34 associated with the lower anchoring cables attached to the second motorized tower 16b are positioned back-to-back on opposite sides of the horizontal support brace 36, with the anchoring cables for each section (i.e., the sections on each side of the motorized tower) extending through the slot to the corresponding winch mechanism.

As described previously, each perpendicularly extending drop line 28 is attached to each of the two horizontally extending anchoring cables 32a, 32b at the point of intersection between the drop line and the corresponding cable. The drop lines are attached with a collar connector, or other attachment or fastener known in the art.

Thus, as see best seen in FIG. 2, with the rigid, perpendicularly extending drop lines 28 attached to each of the two horizontally extending anchoring cables 32a, 32b, the drop lines 28 and attached drip tubes 30 are secured into a nominal position in an even, spaced-apart relationship. The securement of the drop lines 28 to the anchoring cables 32a, 32b, and the rigidity of the anchoring cables pulled taut between the corresponding opposing winch mechanisms 34 ensures that the spaced-apart relationship of the plurality of drip lines 30 is maintained, and ensures that the relative positions of the drip lines 30 with respect to the two motorized towers 16a, 16b is likewise maintained when the winch mechanisms 34 are locked into position.

With the drop lines 28 attached to the two anchoring cables 32a, 32b as described, the positions of the drip tubes 30 with respect to the motorized towers 16a, 16b can be adjusted or shifted by releasing the winch mechanisms 34 connected to those two cables 32a, 32b at one of the first or second motorized towers 16a, 16b, and by winding the slack released cable onto the corresponding winch mechanism 34 at the other corresponding tower, effectively moving or shifting both anchoring cables 32a, 32b either inwardly or outwardly with respect to the center pivot tower.

Because the rigid drop lines 28 are attached to both of the anchoring cables 32a, 32b, shifting the position of those cables correspondingly shifts the position of the lower end of the drop lines 28, which in turn shift the position of the drip tubes 30 attached to the lower end of the drop lines 28. Because the longitudinal position of each drop line 28 at its point of connection with the conduit 12 is fixed, the drop line 28 is flexed in a selected direction upon shifting of the anchoring cables 32a and 32b. Therefore, a closer spacing vertical of the cables 32a and 32b with the cables connected to the drop lines 28 near the lower ends thereof is generally preferred to facilitate flexing of the drop lines 28.

Thus, as depicted in FIG. 3, the two anchoring cables 32a, 32b can be shifted towards the second motorized tower 16b by winding an equal amount of cable onto the two winch mechanism 34 attached to those cables (and releasing the cables from the winches at the first motorized tower, not shown in FIG. 3) to correspondingly move the drop lines 28 and thus the drip tubes from their nominal position (shown by element number 30') to their new position (shown by element number 30), such that the drip tubes are shifted along line x a desired distance. With the drip tubes 30 in their desired position, the anchoring cables 32a, 32b are pulled taut between the corresponding winch mechanisms 34 and the winch mechanisms locked to maintain the drip tubes 30 in their new position.

It should be apparent that the drip tubes 30 could similarly be shifted in the opposite direction by switching the operation just described and releasing slack form the winch mechanisms at the second motorized tower 16b and winding that slack on the winch mechanism at the first motorized tower 16a.

It should also be apparent that while shifting the position of the anchoring cables 32a, 32b and the attached drop lines 28 and drip tubes 30 changes the position of the drag path of the drip tubes 30 with respect to the motorized tower (i.e., the drip tubes 30 are shifted either closer to or further from the tower), that that spacing between adjacent drop lines 28 and drip tubes 30 remains unchanged, as each drop line 28 is attached to the two anchoring cables 32a, 32b, and moving the two anchoring cables 32a, 32b moves all of the drop lines 28 and drip tubes 30 equally and simultaneously.

Figure 5:
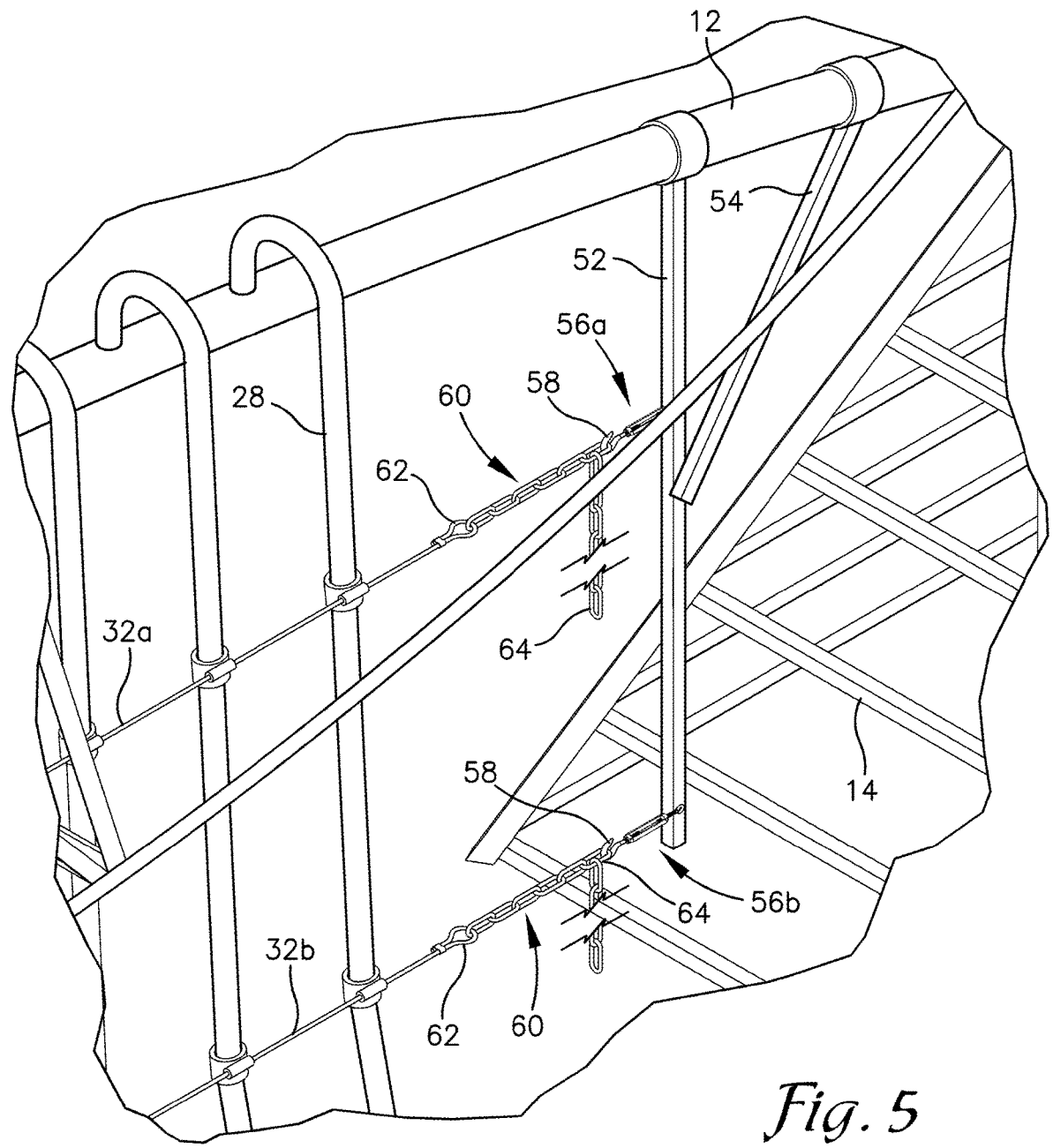
FIG. 5 is a close-up view of a hook and chain assembly for use in combination with one of the winch drive mechanisms for adjusting the relative position of the drip tubes.

FIG. 5 depicts a cable shifting means for shiftably connecting ends of the anchoring cables 32a and 32b to a cable support bracket 52. The cable support bracket 52 is connected to and depends vertically from the water distribution conduit 12 between the fixed center pivot tower 14 and the drop line 28 closest to tower 14. A lateral brace 54 is connected to the support bracket 52 medially along its length and extends at an angle relative thereto with an opposite end connected to the water distribution conduit 12. The cable shifting means include two hook assemblies 56a and 56b connected to the cable support bracket 52 in vertically spaced alignment and at the height of cables 32a and 32b respectively. Each hook assembly 56a and 56b includes a hook 58 at a distal end thereof. Each cable shifting means further includes a length of a chain 60 connected to the end of each cable 32a and 32b closest to the center pivot tower 14. In the embodiment shown, a loop 62 is formed in the end of each cable 32a and 32b for connecting the respective length of chain 60 thereto.

Each of the sections of chain 60 is of a length sufficient to allow the desired shifting of the associated longitudinal shifting of the cables 32a and 32b and may for example be approximately two feet long. Any of the links 64 of a chain 60 can be connected to the associated hook 58 which allows the operator to take up or release slack from the end of the respective cable 32a or 32b as it is shifted longitudinally.

Other means for shifting the cable as described are contemplated by the present invention. For example, the cable may be wound onto a spooling device, wound onto a tower structural member, wrapped around lugs on the tower, pulled and clamped into place on the tower, pulled through a ratchet mechanism, or various other means of securing cables known in the art.

Adjustment or shifting of the positions of the drip tubes 30 affords numerous benefits not allowed by fixed position systems known in the prior art. The mobile drip irrigation system with adjustable drip line positioning of the present invention can be adjusted as needed by a user to accommodate variations in the crops being grown in the agricultural field in which the system is used.

For example, in newly seeded field the anchoring cables can be adjusted to position the drip tubes in a nominal position such that they drag directly over the soil covering the newly planted seeds so that water from the drip tubes is directed precisely to the seeds.

After the seeds germinate and the seedlings emerge above the soil, the anchoring cables can be adjusted or shifted from the nominal position so that the drip tubes are dragged in close proximity to, but not directly over, the fragile young seedlings to avoid damaging the new plants.

And, once the plants are well established, the position of the drip lines can be further adjusted—to direct water further from the plant to encourage root growth, or closer to the studier plant to minimize evaporation or wasted water.

The mobile drip irrigation system with adjustable drip line positioning of the present invention also allows adjustment of the drip tube position for seasonal changes in the planting position, or for crop rotation. For example, it may be beneficial to plant a different crop in a subsequent season in what was the rows between the previous season's crops to avoid continued soil compaction in those same rows. That adjustment to the position of the drip tubes is easily accomplished with the system of the present invention, with all the drip tubes in a section being easily positioned through the use of winch mechanisms as described above.

The adjustable drip tube positioning of the present invention can be implemented in other manners than the specific embodiment just described. For example, the system may be implemented on a lateral or linear drip tube irrigation system.

Figure 6:
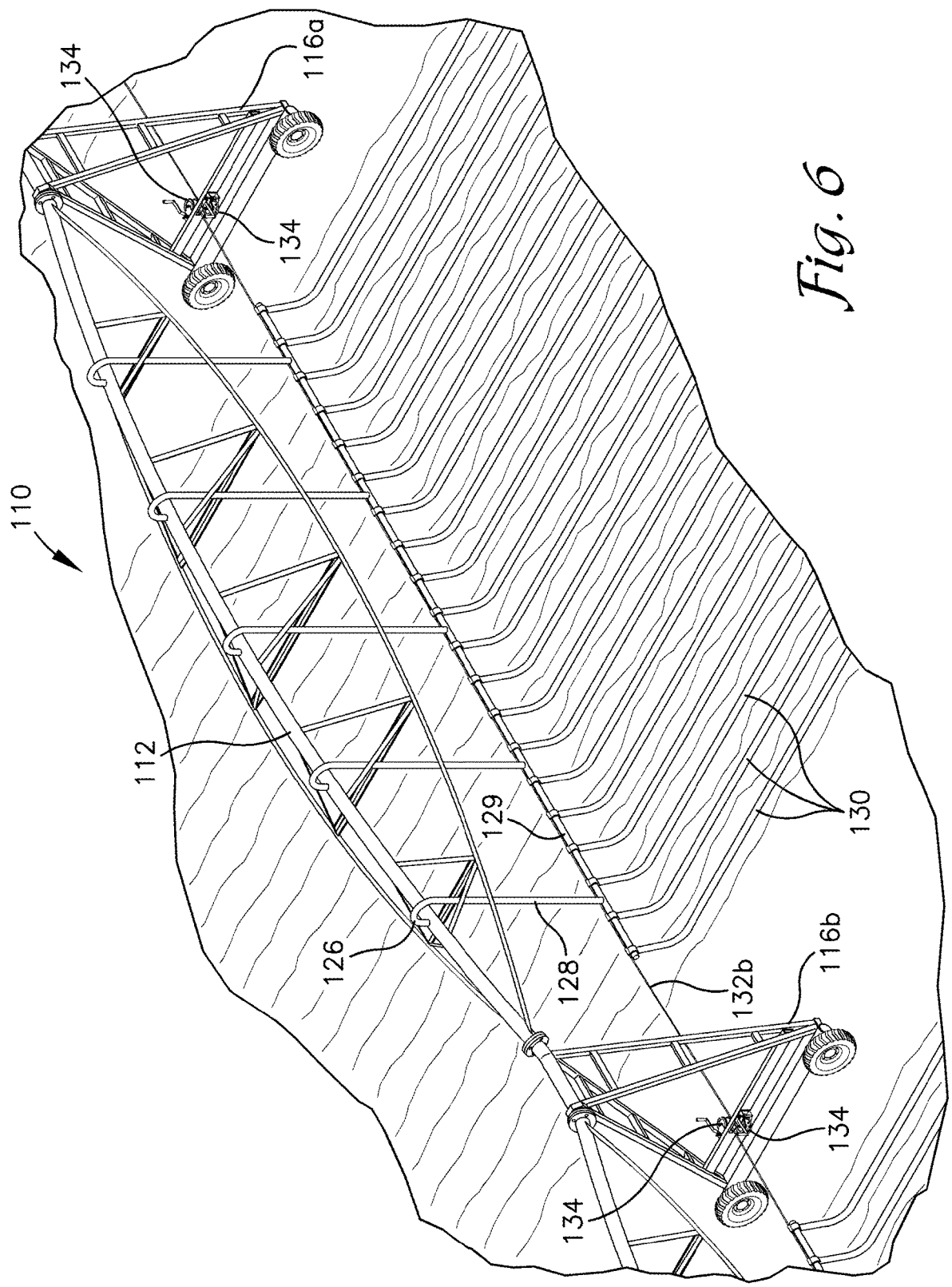
FIG. 6 is a perspective view of a portion of a mobile center-pivot drip line irrigation system with adjustable drip tube positioning used with a manifold distribution system in accordance with an alternative exemplary embodiment of the present invention.

Or, turning to FIG. 6, the system may be implemented in other configurations. A mobile drip tube irrigation system with adjustable drip tube positioning in accordance with an alternative exemplary embodiment of the present invention is depicted as numeral 110.

A section of the irrigation system 110 includes first and second motorized towers 116a, 116b, with a water distribution conduit 112 extending along the upper portion of the section. U-shaped elbows 126 and drop lines 128 extend from the water distribution conduit 112 in a manner similar to that previously described with respect to the first exemplary embodiment. However, in the system 110 shown in FIG. 6, the elbows 126 and drop lines 128 are fewer in number, with the drop lines 128 extending downwardly to a manifold 129 positioned closer to the bottom of the irrigation system.

Drip tubes 130 are attached to and extend down from the manifold 129, with the plurality of drip tubes spaced similarly to the spacing depicted in the first embodiment described above. The drop lines or drop tubes 128 provide water to the manifold 129 which directs water to the attached drip tubes 130, or water emitters, which emit the water along the agricultural field.

A single anchoring cable 132b extends across the section, with each end of the cable attached to a winch mechanism 134 attached to the first and second motorized towers 116a, 116b, respectively. The anchoring cable 132b is adjustable using the winch mechanisms in the manner previously described. However, in this embodiment, the anchoring cable 132b is attached to the manifold 129 so that shifting or adjusting the anchoring cable 132b similarly moves the entire manifold 129, which moves the drip tubes 130 to the desired position.

While the adjustment mechanism of this embodiment is similar in operation to the mechanism described with respect to the first exemplary embodiment, the irrigation system 110 depicted in FIG. 6 uses only a single anchoring cable 132b and only two winch mechanisms 134, and fewer U-shaped elbows 126 and drop lines 128.

Figure 7:
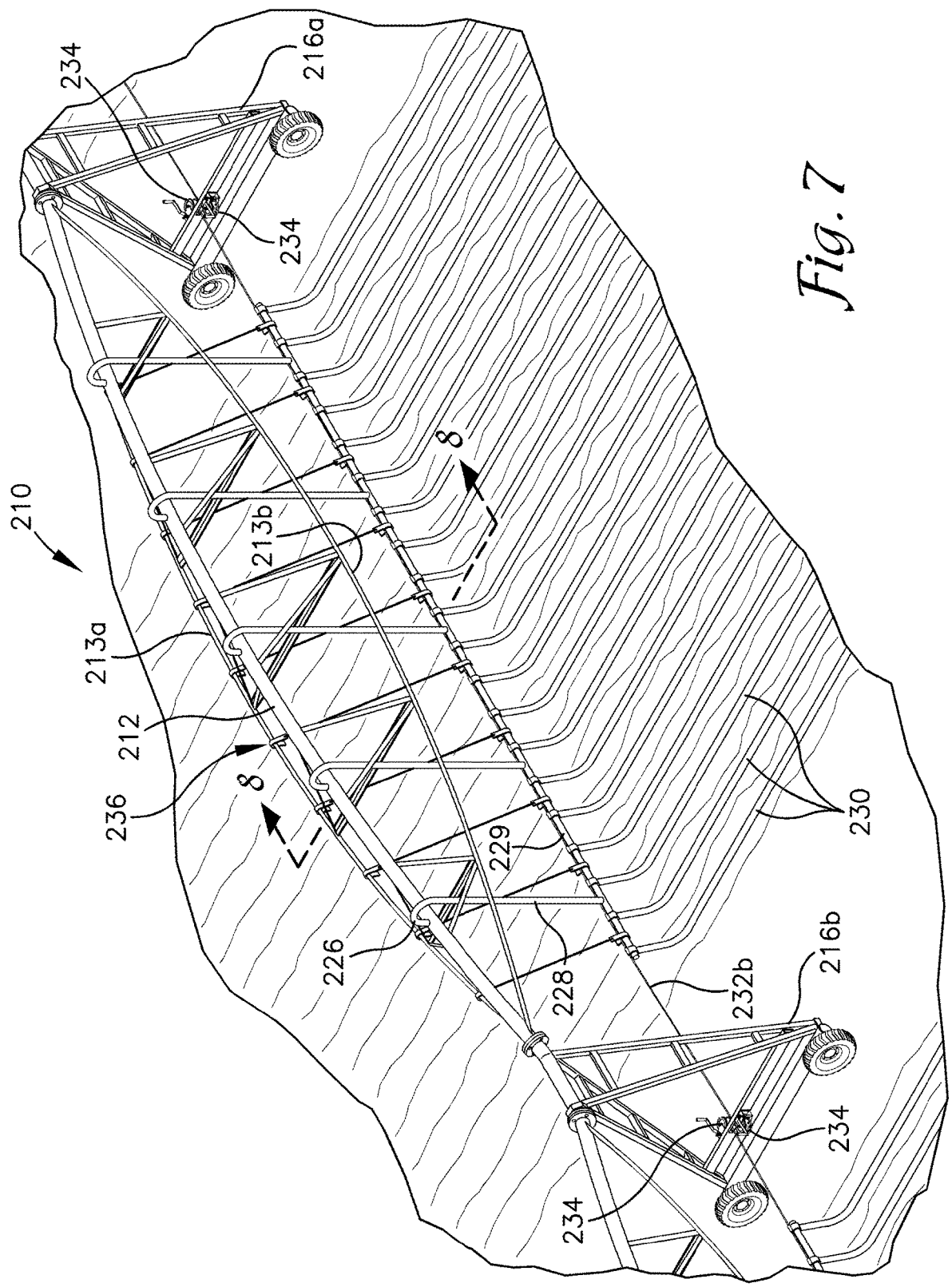
FIG. 7 WITH cables and clips is a perspective view of a portion of a mobile center-pivot drip line irrigation system with adjustable drip tube positioning used with a manifold distribution system in accordance with an alternative exemplary embodiment of the present invention.

Turning to FIG. 7, a mobile drip tube irrigation system with adjustable drip tube positioning in accordance with an alternative exemplary embodiment of the present invention incorporating a plurality of support restraints is depicted as numeral 210.

System 210 is otherwise identical to the exemplary embodiment of the system described above with respect to FIG. 6, and includes first and second motorized towers 216a, 216b, with a water distribution conduit 212 extending along the upper portion of the section. First and second truss members 213a, 213b extend generally alongside the water distribution conduit 212, attaching at the conduit near each end of the section, and bowing outwardly along the center portion to provide structural support to the system. U-shaped elbows 226 and drop lines 228 extend from the water distribution conduit 212 in a manner similar to that previously described. Drop lines 228 extend downwardly to a manifold 229 positioned closer to the bottom of the irrigation system.

Drip tubes 230 are attached to and extend down from the manifold 229, with the plurality of drip tubes spaced similarly to the spacing depicted in the first embodiment described above. The drop lines 228 provide water to the manifold 229 which directs water to the attached drip tubes 230 which emit the water along the agricultural field.

A single anchoring cable 232b extends across the section, with each end of the cable attached to a winch mechanism 234 attached to the first and second motorized towers 216a, 216b, respectively. The anchoring cable 232b is adjustable using the winch mechanisms in the manner previously described. In this embodiment, the anchoring cable 232b is attached to the manifold 229 so that shifting or adjusting the anchoring cable 232b similarly moves the entire manifold 229, which moves the drip tubes 230 to the desired position. As in the system 110 depicted in FIG. 6, the irrigation system 210 uses only a single anchoring cable 232b and only two winch mechanisms 234.

A plurality of clip-on support restraints 236 are positioned at intervals along the width of the irrigation system 210, extending between the first truss member 213a and the manifold 229 to provide additional support to the manifold 229 and attached drip tubes 230. The support restraints 236 act to relieve stress on the drop lines 228 which otherwise support the manifold 229, and further act to maintain the manifold in an aligned position across the width of the section.

Figure 8:
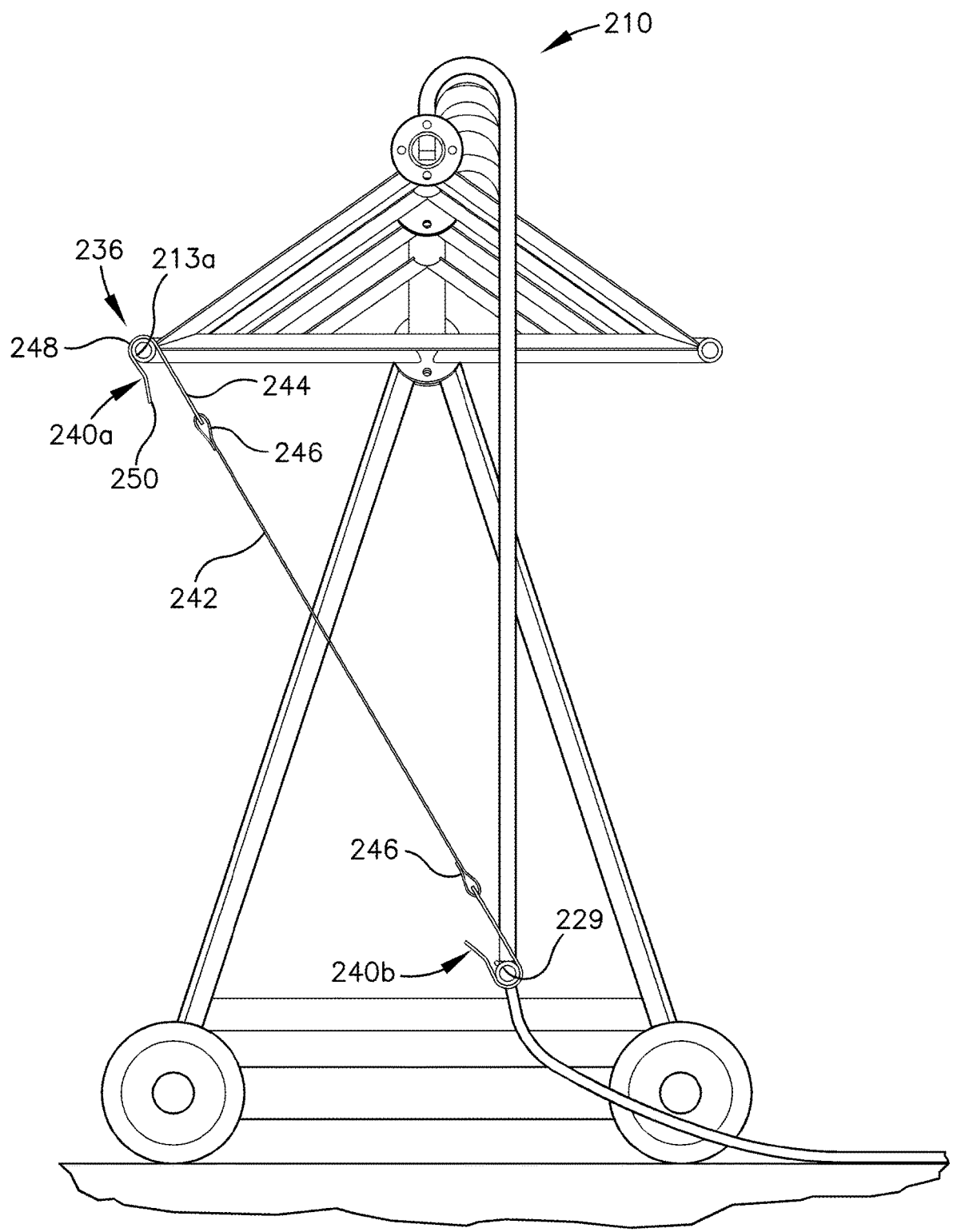
FIG. 8, cross section view of FIG. 7.

As best seen in FIG. 8, each support restraint 238 comprises first and second attachment clips 240a, 240b connected at opposite ends of a support cable 242. Each attachment clip 240a, 240b comprises a shank 244 having an open eye portion at its upper end for attaching to a loop 246 at each end of support cable 242. The shank 244 extends through a "U" shaped bend to form a hook 248, with the outer end 250 of the hook flared outwardly.

The hook 248 of the attachment clip 240a, 240b is configured to conform generally to the cylindrical shaped first truss member 213a and the cylindrical shaped manifold 229, with the flared open portion of the hook allowing the clip to be readily attached to either member by simply clipping it on. Preferably, attachment clips 240a, 240b are identical, such that they are interchangeable so that the support restraint 238 can be used in either orientation.

As seen in FIG. 8, with the support restraint 238 attached to the first truss member 213a and the manifold 229, the manifold is secured upwardly and forwardly by the support restraint 238. With a plurality of support restraints 238 positioned at intervals along the section as shown in FIG. 7, it can be seen that the manifold 229 will be similarly supported along the entire width of the section.

It should be apparent that the support restraints 228 may similarly be used in conjunction with the first exemplary embodiment of FIG. 1, with the support restraint extending between the first truss member and the lower anchoring cable 32b in that embodiment. In that configuration, the support restraints would similarly support and secure the lower anchoring cable 32b.

Thus, it can be seen that numerous variations of implementation are contemplated by the present invention, including systems with one, two, or more anchoring cables used to move drop lines or manifolds in order to effect the desired movement of the drip tubes.

Other variations are also contemplated. For example, the attachment of the anchoring cable to the towers may employ a winch mechanism at one end of the cable to attach to one tower, with a chain link and hook adjustment at the opposite end to attach to the other tower. Slack may be introduced into, or taken up from, the anchoring cable by adjusting the chain linkage, and the anchoring cable pulled taut with the single winch mechanism. Or, other configurations of manifolds or drop lines may be used. For example, rather than a single manifold as shown in FIG. 5, systems with multiple manifolds attached to the anchoring cables are within the scope of the present invention.

From the above, it can be seen that the mobile drip tube irrigation system of the present invention allows a user to adjust the position of the drip tubes to accommodate various needs in providing water to the agricultural field.

While the system and method of the present invention have been described herein with respect various exemplary embodiments, the invention may likewise be used with other configurations of irrigation systems. Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A method of positioning an adjustable drip line in a mobile drip irrigation system, the mobile drip irrigation system including:

a water distribution conduit extending between a first tower and a second tower, a plurality of drip tubes in fluid communication with the water distribution conduit, each of the drip tubes is operable to emit water onto an agricultural field; the method comprising:

shiftably connecting a first end of a first anchoring cable to the first tower and shiftably connecting a second end of the first anchoring cable to the second tower;

securing the plurality of drip tubes to the first anchoring cable in a first selected position relative to the agricultural field;

laterally shifting the first anchoring cable relative to the first tower and the second tower imparting a corresponding lateral shift of the plurality of drip tubes to a second selected position spaced laterally relative to the first selected position relative to the agricultural field; and after imparting the corresponding lateral shift of the plurality of drip tubes to the second selected position, securing the first anchoring cable against lateral shifting relative to the first tower and the second tower to maintain the drip tubes in the second selected position.

2. The method of claim 1, wherein laterally shifting the first anchoring cable relative to the first tower and the second tower comprises operating at least one winch mechanism to laterally shift the first anchoring cable.

3. The method of claim 2, wherein operating the at least one winch mechanism comprises releasing the first end of the first anchoring cable from a first winch mechanism affixed to the first tower and adjustably tightening the first anchoring cable at a second winch mechanism affixed to the second tower.

4. The method of claim 1, wherein laterally shifting the first anchoring cable relative to the first tower and the second tower comprises adjusting at least one chain link and hook fastener joined to at least one end of the first anchoring cable.

5. A method of positioning an adjustable drip line in a mobile drip irrigation system, the mobile drip irrigation system including:

a water distribution conduit extending between a first tower and a second tower, a plurality of drip tubes in fluid communication with the water distribution conduit, each of the drip tubes is operable to emit water onto an agricultural field, the method comprising:

shiftably connecting a first end of a first anchoring cable and a first end of a second anchoring cable to the first tower and a second end of the first anchoring cable and a second end of the second anchoring cable to the second tower, securing the plurality of drip tubes to the first anchoring cable and to the second anchoring cable in a first selected position relative to the agricultural field, laterally shifting the first anchoring cable and the second anchoring cable relative to the first tower and the second tower imparting a corresponding lateral shift of the plurality of drip tubes to a second selected position spaced laterally relative to the first selected position relative to the agricultural field; and after imparting the corresponding lateral shift of the plurality of drip tubes to the second selected position, securing the first anchoring cable against lateral shifting relative to the first tower and the second tower to maintain the drip tubes in the second selected position.

6. The method of claim 1, further comprising supporting the first anchoring cable or a second anchoring cable with a support restraint attached between the respective anchoring cable and a first truss member, the first truss member extending generally parallel and in spaced apart relationship to the water distribution conduit.

7. The method of claim 1, further comprising extending a plurality of drop lines between the water distribution conduit and the plurality of drip tubes.

8. The method of claim 7, further comprising extending a manifold between the plurality of drop lines and the plurality of drip tubes.

9. The method of claim 8, further comprising supporting the manifold with a support restraint attached between the manifold and a first truss member, the first truss member extending generally alongside and in spaced apart relationship to the water distribution conduit.

10. A method of laterally shifting a plurality of drip tubes in fluid communication with a water distribution conduit of a mobile drip irrigation system, the method comprising:

shiftably connecting at least one anchoring cable at a first end to a first tower and at a second end to a second tower, securing the plurality of drip tubes to the at least one anchoring cable;

arranging each of the plurality of drip tubes into a first nominal position in essentially parallel relationship relative to the other drip tubes;

laterally shifting the at least one anchoring cable relative to the first tower and the second tower imparting a corresponding lateral shift to a new position of the plurality of drip tubes secured to the at least one anchoring cable;

pulling taut the at least one anchoring cable and securing the at least one anchoring cable against lateral shifting such that the plurality of drip tubes are maintained in the new position.

11. The method of claim 10, wherein at least one of the first end and the second end of the at least one anchoring cable is affixed to a cable shifting means for shiftably connecting the ends of the at least one anchoring cable to a cable support bracket.

12. The method of claim 10, further comprising supporting the at least one anchoring cable with a support restraint attached between the at least one anchoring cable and a first truss member, the first truss member extending generally parallel and in spaced apart relationship to the water distribution conduit.

13. The method of claim 10, further comprising extending a plurality of drop lines between the water distribution conduit and the plurality of drip tubes.

14. The method of claim 13, further comprising extending a manifold between the plurality of drop lines and the plurality of drip tubes.

15. The method of claim 14, further comprising supporting the manifold with a support restraint attached between the manifold and a first truss member, the first truss member extending generally alongside and in spaced apart relationship to the water distribution conduit.

16. A method of laterally shifting a plurality of drip tubes of a mobile irrigation system along a surface of an agricultural field, comprising:

securing a plurality of drop lines to at least one anchoring cable, the at least one anchoring cable extending between a first winch mechanism affixed to a first tower and a second winch mechanism affixed to a second tower, wherein the plurality of drop lines is in fluid communication with a water distribution conduit, the plurality of drop lines is in fluid communication with the plurality of drip tubes, and the water distribution conduit extends between the first tower and the second tower;

arranging the plurality of drip tubes into a nominal position in essentially parallel relationship relative to the other drip tubes, wherein each of the plurality of drip tubes is operable to emit water onto an agricultural field;

operating the mobile drip irrigation system in the nominal position as the mobile irrigation system is moved across the agricultural field;

laterally shifting the position of the plurality of drip tubes from the nominal position to a new position by releasing the at least one anchoring cable at the first winch mechanism and adjustably tightening the at least one anchoring cable at the second winch mechanism; and operating the mobile drip irrigation system in the new position.

17. The method of claim 16, further comprising adjustably securing the at least one anchoring cable to the first winch mechanism and the second winch mechanism.

18. The method of claim 16, further comprising supporting the at least one anchoring cable with a support restraint attached between one of the at least one anchoring cable and a first truss member, the first truss member extending generally alongside and in spaced apart relationship to the water distribution conduit.

19. The method of claim 16, further comprising extending a manifold between the plurality of drop lines and the plurality of drip tubes.

20. The method of claim 19, further comprising supporting the manifold with a support restraint attached between the manifold and a first truss member, the first truss member extending generally alongside and in spaced apart relationship to the water distribution conduit.

* * * * *